(12) United States Patent
Marathe et al.

(10) Patent No.: US 10,007,581 B2
(45) Date of Patent: Jun. 26, 2018

(54) SYSTEMS AND METHODS FOR CONSTRUCTING COMPOSABLE PERSISTENT DATA STRUCTURES

(71) Applicant: Oracle International Corporation, Redwood City, CA (US)

(72) Inventors: Virendra J. Marathe, Florence, MA (US); Joseph H. Izraelevitz, Rochester, NY (US)

(73) Assignee: Oracle International Corporation, Redwood City, CA (US)

( * ) Notice: Subject to any disclaimer, the term of this patent is extended or adjusted under 35 U.S.C. 154(b) by 145 days.

(21) Appl. No.: 14/988,566

(22) Filed: Jan. 5, 2016

(65) Prior Publication Data

US 2016/0314044 A1    Oct. 27, 2016

Related U.S. Application Data

(60) Provisional application No. 62/150,750, filed on Apr. 21, 2015.

(51) Int. Cl.
| | | |
|---|---|---|
| G06F 11/00 | (2006.01) | |
| G06F 11/14 | (2006.01) | |
| G06F 3/06 | (2006.01) | |

(52) U.S. Cl.
CPC ........ G06F 11/1471 (2013.01); G06F 3/0619 (2013.01); G06F 3/0653 (2013.01);
(Continued)

(58) Field of Classification Search
CPC ............. G06F 11/1471; G06F 11/0724; G06F 11/073; G06F 11/1402; G06F 3/0673;
(Continued)

(56) References Cited

U.S. PATENT DOCUMENTS

| | | | |
|---|---|---|---|
| 8,560,511 B1 * | 10/2013 | Matthews | G06F 17/24 707/704 |
| 2010/0250507 A1 * | 9/2010 | Omara | G06F 17/30958 707/704 |

(Continued)

OTHER PUBLICATIONS

Shivaram Venkataraman, et al., "Consistent and Durable Data Structures for Non-Volatile Byte-Addressable Memory", In Proceedings of the 9th USENIX Conference on File and Storage Technologies, FAST'11, pp. 1-15.

(Continued)

*Primary Examiner* — Joseph D Manoskey
(74) *Attorney, Agent, or Firm* — Robert C. Kowert; Meyertons, Hood, Kivlin, Kowert & Goetzel, P.C.

(57) ABSTRACT

A technique referred to as "data structure chronicles" is described that may be used to build strictly failure resilient persistent concurrent data structures. A "chronicle" maintains a persistent history of operations invoked on a persistent data structure that can be replayed to recover the current consistent state of the data structure after a failure. The chronicle technique may also enable composability of data structure operations with the enclosing application. In addition, the chronicle technique is non-blocking, a desirable progress condition for concurrent data structures. A lock free, non-blocking chronicle stack algorithm is described that may outperform a lock-based implementation in the presence of high contention. In addition, a lock free, non-blocking chronicle queue algorithm is described.

19 Claims, 6 Drawing Sheets

(52) U.S. Cl.
CPC ...... *G06F 3/0673* (2013.01); *G06F 2201/805* (2013.01); *G06F 2201/82* (2013.01); *G06F 2201/86* (2013.01)

(58) Field of Classification Search
CPC .................. G06F 3/0619; G06F 3/0653; G06F 2201/805; G06F 2201/82; G06F 2201/86
USPC ......................................... 714/15, 19, 20, 21
See application file for complete search history.

(56) References Cited

U.S. PATENT DOCUMENTS

| | | | | |
|---|---|---|---|---|
| 2014/0156959 | A1* | 6/2014 | Heidelberger | G06F 5/065 711/163 |
| 2014/0195564 | A1* | 7/2014 | Talagala | G06F 12/0804 707/802 |
| 2016/0092265 | A1* | 3/2016 | Kogan | G06F 9/4843 718/102 |

OTHER PUBLICATIONS

R. Kent Treiber, "Systems Programming: Coping with Parallelism", Technical Report RJ 5118, IBM Almaden Research Center, 1986, pp. 1-42.

Maurice Herlihy, "A Methodology for Implementing Highly Concurrent Data Objects", ACM Transactions on Programming Languages and Systems, vol. 15, No. 5, Nov. 1993, pp. 745-770.

Louis Alex Eisner, et al., "Quill: Exploiting Fast Non-Volatile Memory by Transparently Bypassing the File System", Department of Computer Science and Engineering, 2013, pp. 1-6, University of California, San Diego.

Greg Barnes, "A Method for Implementing Lock-Free Shared Data Structures", In Proceedings of the Fifth Annual ACM Symposium on Parallel Algorithms and Architectures, SPAA '93, 1993, pp. 261-270.

Ric Wheeler, "Persistent Memory and Linux: New Storage Technologies and Interfaces", Linux Storage and File and Memory Manages Summit, 2013, pp. 1-29.

Maurice P. Herlihy, et al., "Linearizability: A Correctness Condition for Concurrent Objects", ACM Transactions on Programming Languages and Systems, vol. 12, No. 3, Jul. 1990, pp. 463-492.

Maurice Herlihy, et al., "Transactional Boosting: A Methodology for Highly-Concurrent Transactional Objects", In Proceedings of the 13th ACM SIGPLAN Symposium on Principles and Practice of Parallel Programming, PPoPP '08, ACM, 2008, pp. 207-216.

Maged M. Michael, et al., "Simple, Fast, and Practical Non-Blocking and Blocking Concurrent Queue Algorithms", In Proceedings of the Fifteenth Annual ACM Symposium on Principles of Distributed Computing, PODC '96, 1996, pp. 267-275.

* cited by examiner

SYSTEMS AND METHODS FOR CONSTRUCTING COMPOSABLE PERSISTENT DATA STRUCTURES

PRIORITY INFORMATION

This application claims benefit of priority of U.S. Provisional Application Ser. No. 62/150,750 entitled "Systems and Methods for Constructing Composable Persistent Data Structures" filed Apr. 21, 2015, the content of which is incorporated by reference herein in its entirety.

BACKGROUND

Field of the Disclosure

This disclosure relates generally to concurrent data structures, and more particularly to systems and methods for constructing persistent data structures that are composable and that adhere to a "strict failure resilience" correctness condition.

Description of the Related Art

Persistent memory technologies such as phase change memory, spin-transfer torque magnetoresistive RAM, memristors, etc., are making inroads into the computing industry. These technologies are expected to come close to matching or even exceeding the performance of DRAM (100-1000× faster than state-of-the-art NAND flash) in the future. In some cases, these persistent memories are byte-addressable (as opposed to the block-addressable nature of disks and flash memory), which enables a move toward integrating non-volatile memories in systems on the memory bus, rather than only across an I/O interface.

Byte-addressability lends itself to a traditional memory (DRAM) style load/store interface to persistent memory. However, many components in the traditional memory hierarchy (e.g. processor caches, memory controller buffers) are expected to be non-persistent in the foreseeable future. Consequently, merely having a load/store interface is not sufficient to ensure persistence. There are existing proposals to augment processors with different cache line flush instructions and persist barrier instructions. In order to leverage the persistence feature of persistent memory, existing software and algorithms for in-memory data access would need to change to account for the attributes of systems that host persistent memory. Research activities in this area include those directed to file systems, programming models, and databases that reflect these differences. These differences are also reflected in some of the existing work being done in the area of persistent data structures. In general, the existing work falls in two categories: (i) the use of memory transactions, which make the solution simple, but which are accompanied by significant bookkeeping overhead, and (ii) the use of ad hoc data structures that appear to work correctly in isolation, but which can incur data losses due to failures at operation boundaries. For example, in a persistent stack, if a failure occurs immediately before a Pop( ) operation returns but after it has persisted, the returned value could be lost.

Some of this existing work (particularly that described by Venkataraman, et al.) addresses the question of correctness conditions for persistent concurrent data structures that builds on the classic linearizability correctness condition for concurrent data structures. While this is a good start, this work does not address the important aspect of composability of data structure operations. Thus, the approach described by Venkataraman, et al. has some serious implications on application correctness. For example, when failures occur at the boundaries of data structure operations, the effects of an operation could be entirely lost.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, the advent of byte-addressable persistent memory technologies may affect the way software that manages persistent data is built. In particular, persistent data representations on these technologies may end up looking similar to in-memory (DRAM) data representations, which would be a significant departure from the traditional serialized or marshalled data representations hosted on magnetic disks and SSDs.

As described in more detail herein, some foundational concurrent data structures (such as stacks, queues, hash tables, etc.) may be redesigned for implementation in byte-addressable persistent memory. While there is significant ongoing research around optimizing or redesigning file systems and databases for persistent memory, the problem of how to implement correct, efficient, and scalable persistent concurrent data structures has received little attention.

The systems and methods described herein may, in various embodiments, apply an approach referred to herein as "Data Structure Chronicles", which is a new technique that enables the construction of ad hoc persistent data structures on emerging byte-addressable persistent memory technologies. Note that ad hoc persistent data structure implementations are likely going to be more efficient than persistent data structure implementations developed using transactional systems. In various embodiments, the techniques described herein may be used to construct efficient persistent data structure implementations of various types that are at the foundation of many important systems, such as storage systems, database systems, cloud infrastructures, etc. These techniques may be applied to many different types of future storage products that are developed on emerging persistent memory technologies by a variety of companies that provide storage systems and/or storage services, in different embodiments.

The systems and methods described herein may, in various embodiments, differ from those described in prior work in that data structures built using these techniques may compose nicely with their enclosing application contexts. In other words, when applying these techniques, untimely failures at operation boundaries may not lead to data loss, as may happen with prior work. In addition, such pending (and interrupted) operations may complete and return during a recovery phase (e.g., following a system, node, memory, or communication failure that interrupted their execution, commitment, and/or responses). The power of these techniques has been demonstrated by building a chronicle stack data structure that outperforms a lock-based persistent stack by an order of magnitude in the presence of high contention. This example chronicle stack implementation is described in detail herein.

In some embodiments, a new correctness condition (called "strict failure resilience") may be enforced for persistent concurrent data structures. The new technique referred to as "data structure chronicles" may then be used to build strictly failure resilient persistent concurrent data structures. In some embodiments, a "chronicle" maintains a persistent history of operations invoked on a persistent data structure that can be replayed to recover the current consistent state of the data structure after a failure. The chronicle technique may also enable composability of data structure operations with the enclosing application, a property that is completely ignored by prior work. Another notable feature of chronicles is that the technique is non-blocking, a desirable progress condition for concurrent data structures. An example embodiment of a lock free chronicle stack algorithm (which is a variant of the Treiber stack) is presented in detail below. As noted above, preliminary performance results illustrate that this chronicle stack, which is non-blocking, can outperform a lock-based implementation by up to an order of magnitude in the presence of high contention.

As previously noted, the trends toward byte-addressable persistent memory technologies may fundamentally change the landscape of I/O interfaces and software stacks. For example, in some embodiments, interfaces may need to be revised to leverage the performance benefits enabled by byte-addressability, and I/O software stacks may need to be redesigned to drastically reduce the code path to access persistent memory. In particular, byte-addressability may enable a DRAM-like load/store interface to persistent memory. This, in turn, may open doors to opportunities to represent persistent data in novel ways that can be accessed far more efficiently than the traditional serialized or marshalled data hosted on magnetic disks or SSDs.

In some embodiments (e.g., in extreme cases), persistent data representations may resemble in-memory data representations. This may tempt programmers to host existing high performance in-memory data representations (e.g., high performance distributed object caches, in-memory databases, etc.) on persistent memory, thereby making them persistent. Furthermore, at the heart of these systems may be found foundational data structures such as stacks, queues, hash tables, etc., all of which may remain unchanged for persistence. While this may sound like an attractive proposition from the programmer's perspective, the realities on the ground may be somewhat different.

As noted above, a new correctness condition, called strict failure resilience, may be built on the correctness condition referred to as "consistent durability", as described by Venkataraman et al. This new correctness condition may address the problems that can result due to failures that occur at the boundaries of data structure operations, where (in prior systems) the effects of an operation could be entirely lost.

In some embodiments, the chronicle technique described herein may enable strict failure resilience for data structure implementations. In addition, it may be non-blocking. As noted above, a strict failure resilient stack has been implemented using the chronicle technique, and a preliminary evaluation has illustrated that, in the presence of high contention, the chronicle stack may outperform a lock-based persistent stack by up to an order of magnitude.

This remainder of this document includes descriptions of the following: the strict failure resilience correctness condition, the chronicle technique, the example chronicle stack, the preliminary evaluation of the chronicle stack, some related work, a conclusion, and an example computing system that implements these techniques. In addition, an example chronicle queue implementation is described.

Correctness for Durable Data Structures

It is common to define the behavior of concurrent method calls through properties such as linearizability. Each object may be assumed to provide a sequential specification, which describes its behavior in sequential executions where method calls do not overlap. To describe an object's concurrent behavior, each method call may be split into two instantaneous events: the call (or invocation), which is when control leaves the caller, and the return (or response), which is when control (and perhaps a result) returns to the caller. Informally, an execution may be said to be linearizable if each method call appears to take effect instantaneously between its invocation and its response events.

Similar to linearizability for volatile concurrent data structures, it may be desirable to define an applicable and simple correctness condition for persistent data structures. As noted above, Venkataraman, et al. defined "consistent durability" as a persistent data structure correctness condition.

In a consistently durable data structure, the following may be true:
  1. For every operation, between its call and its return, the operation will have linearized.
  2. For every operation, between its call and its return, the operation will have become persistent.
  3. The persistent history is a prefix of the linearized history (e.g., it is a subset of the linearized history that lags the linearized history).

This "consistent durability" correctness condition builds nicely on linearizability, and maintains the simplicity and elegance of linearizability. However, it applies only to the data structure's internal state. In other words, it does not compose with the enclosing application's context. In particular, it has been found that failures (e.g. power outages, program crashes, etc.) at the boundaries of operations that target such data structures can easily lead to data loss. For example, consider the classic "Towers of Hanoi" problem, where each "move" comprises popping an object from one stack and pushing it onto another stack. If a failure occurs after a pop has linearized and persisted, but before it returns to the enclosing program context, the popped object may be lost. In this case, upon recovery from the failure, the popped object is no longer reachable since all references to it (e.g., a pointer to the object stored in a CPU register) are lost.

To address this problem, a stronger correctness condition has been proposed for persistent data structures. This correctness condition is referred to herein as "strict failure resilience". In addition to the constraints imposed by "consistent durability", "strict failure resilience" additionally constrains the data structure to allow for the possibility of composition.

In a strictly failure resilient data structure, the following may be true:
 1. For every operation, between its call and its return, the operation will have linearized.
 2. For every operation, between its call and its return, the operation will have become persistent.
 3. The persistent history is a prefix of the linearized history (as above).
 4. If there is a failure between a call and its corresponding return, a dedicated recovery handler executed during restart guarantees that, while satisfying all previous conditions, either (i) the operation does not have any effect on the data structure, or (ii) the operation completes and returns; in either case, the data structure can be queried to determine the operation's result after recovery.

The first three conditions shown above imply that if a data structure is strictly failure resilient, it is also consistently durable. The last condition implies that if the enclosing application has recovery capabilities of its own, the data structure's recovery guarantees can be leveraged to precisely pinpoint points of failure (e.g., before or after invocation of the data structure's operations). In some embodiments, this information may, in turn, be used to either continue execution, or to roll back execution to a "safe point" (e.g., to a point at which the data structure is known to be in a consistent state). For example, again considering the "Towers of Hanoi" example, if an application executed a pop( ) operation and a failure occurred after it persisted but before the result of the pop( ) was returned to the application, strict failure resilience allows the application's recovery to return the pop( )'s result to the calling context. In general, strict failure resilient data structures such as those described herein compose with the enclosing application context, but consistently durable data structures do not.

In some embodiments, in order to adhere to strict failure resilience, data structures may be required to tightly monitor all outstanding method calls in persistent state. In such embodiments, the data structure, in its persistent state, must effectively be able to determine, for every outstanding method call, where is it in its execution. For example, the data structure may determine that its state with respect to a given outstanding method call corresponds to one of the following:
 1. Its state prior to invocation of the method call
 2. Its state after returning from the method call
 3. Its state in a window of operation between persisting the method call and returning from the method call
 4. Its state in a window of operation between invoking the method call and persisting the method call In some embodiments, each of the scenarios listed above may require a recovery process to take a different sets of actions during recovery (e.g., following a failure and/or upon resetting following a failure). For example, if a failure occurs before invocation of an operation or after returning from an operation, there may be no needed to make any changes to the data structure during recovery. If a failure occurs after an operation persists but before its return, the response may need to be issued during recovery. In the last case, in which a failure occurs between the invocation of an operation and operation persist, the "strict failure resilience" correctness condition may provide some flexibility in the implementation of the recovery. For example, the recovery process may have the flexibility to choose whether to roll back the effects of any operations that fall into this scenario entirely, or to execute and persist such operation and return their results. In either case, if the enclosing application tracks invocations to strict failure resilient data structures, its recovery system may be able to determine which outstanding operations completed and returned (which is critical for correct recovery) and which operations did not have any effect (and can be ignored by the application's recovery system).

The Chronicle Design Pattern

A generic technique for building strictly failure resilient data structures is described herein, according to at least some embodiments. In various embodiments, this "chronicle" design pattern may be used to create a variety of non-blocking, strictly failure resilient data structures that allow for higher concurrency and less overhead than corresponding data structures in a traditional transactional system.

In some existing non-persistent linearizable data structures, all operations contend on a fixed set of locations (e.g. the head and tail pointers of a list), which are changed via an atomic compare-and-swap (CAS) operation and comprise the shared global state. By contrast, in some embodiments of persistent data structures that employ the chronicle design pattern described herein, these CAS operations may be consolidated into a single location, contained within a State object. In such embodiments, instead of using a CAS operation to swing pointers within the object's shared state, a CAS operation may be used to create a new global state and append it to the previous version. By ensuring all previous States have been written to persistent memory before appending the new State, the approach described herein may ensure that all previous operations have linearized and persisted. By attaching all method call data to the State object associated with its linearization point, it may always be possible to determine the progress of any ongoing operation. The pseudo-code in lines 1-35 below depicts an example State object for a chronicle stack (described in more detail later), according to at least some embodiments. For example, a linked stack may be built using instance of the State object. In this example, one such linked stack is the "chronicle", which represents a log of the operations that have been invoked on the chronicle stack. Note that different data structures may include different implementations of the State object, in different embodiments. For example, a chronicle queue's State object may contain the Head and Tail pointers, or may point to a metadata structure that contains the Head and Tail pointers, in different embodiments.

In various embodiments, the chronicle design pattern may also closely track all the outstanding method calls on the data structure by using an "invocation and return" handshake protocol. This may also be referred to as the "persistent signal" protocol. In some embodiments, every thread may have a persistent space on the data structure into which it can write its invocation arguments. On return, the data structure may do the opposite, i.e., it may write the return values into the same space and then return to the enclosing application context. In order to distinguish this protocol from a regular call and return in the pseudo-code shown below, the commands "invoke" and "respond" are used, rather than the commands "call" and "return". As illustrated in this example, the first step taken by the operation is the invoke command, and the last step taken by the operation before returning is the respond command.

The pseudo-code in lines 39-68 depicts an example interface to the persistent signal protocol. In this example, the specific method call is identified by the invoking thread's ID, a sequence number that is generated by the thread for the call (which may be unique for the thread), and the method ID.

One embodiment of an implementation of the State Object and ChronicleStack described above may be illustrated by the following example pseudo-code.

```
1    class State {
2        State *next; // the next State in the chronicle
3        Node *head; // the head Node in the stack
4        int thread_id; // the thread id of the
5                       // thread doing this operation
6        int operation; // which operation (push or pop)
7        int seqNum; // a unique id per
8                    // thread of this operation
9        void *ret; // return value of this operation
10
11       // the thread_id, seqNum, ret, and operation member vars
12       // in the chronicle allow the determination of a
13       // totally ordered history of the stack,
14       // e.g. "Thread 1 did a pop as its 5th operation".
15
16       State(Node *n, State *nxt,
17           int tid, int op, int seq) {
18
19           next=nxt;head=n;
20           thread_id=tid; operation=op;
21           seqNum=seq;
22       }
23   };
24
25   class ChronicleStack {
26       State *chronicle; // a log of all operations that have
27                        // been invoked on this data structure.
28       State *current; // the most recent persisted entry.
29       SignalLog *signalLog;
30       ChronicleStack( ) {
31           chronicle = new
                 State(NULL,NULL,NO_THREAD,INIT);
32           current = chronicle;
33           signalLog = new SignalLog( );
34       }
35   };
```

One embodiment of an implementation of the SignalLog interface described above may be illustrated by the following example pseudo-code. In some embodiments, this may serve as the interface that enables an explicit handshake between the chronicle stack and the enclosing application for correct recovery.

```
39   class Invocation {
40       function *func; // pointer to method
41       Hashmap args; // arguments
42       void *ret; // return value
43   }
44
45   class SignalLog {
46
47       // Persistently stores the record of the
48       // invocation of an operation in the log.
49       Invocation *sigInvoke(int thread_id, int seqNum,
50           int method, void *args,...);
51
52       // Persistently stores the record of the
53       // response of an operation in the log.
54       void sigResponse (int thread_id, int seqNum,
55           int method, void *ret);
56
57       // Provides a list of all recorded invocations
58       // without a return in the log.
59       vector<Invocation> getIncompleteInvocations( );
60
61       // Looks up a response for a specific invocation; used
62       // by enclosing application context to get the response
63       // during recovery; will return NULL if there is no
64       // corresponding invocation found in the signal log;
65       // must be invoked after the data structure's recovery.
66       void *lookupSigResponse(int thread_id, int seqNum,
67           int method);
68   }
```

The Chronicle Stack

As previously noted, in order to demonstrate the utility of the chronicle design pattern, a persistent variant of the non-blocking Treiber stack was developed. Like the original Treiber stack, this variant is a linearizable concurrent data structure. However, unlike the original Treiber stack, this variant may provide strict failure resilience.

Implementation

As noted above, the example pseudo-code in lines 1-35 above depicts the ChronicleStack object, according to at least some embodiments. In this example, the chronicle pointer may be used to build a chronicle of the stack's state, ensuring that it is always possible to access a totally ordered history of operations. By referring to this totally ordered chronicle, the correct state of the object can always be correctly recovered, even after a failure.

The example pseudo-code shown in lines 69-163 below depicts the example chronicle stack implementation. Notice that the first step taken by both push and pop operations is to log the method call with the stack's signal log. As described herein, the logging must be persistent. This logging may, in turn, be used during a recovery operation to ensure that the logged method calls are all completed and that all of them return a response to the enclosing application context.

In the example described herein, the flushChronicle( ) method may be invoked to flush the chronicle forward from a given State entry. In some embodiments, as long as the chronicle is always flushed before beginning an operation, the implementation may guarantee that the stack, as viewed in persistent memory, is consistent when the operation begins. By combining the history chronicle with the linearizing CAS operation, the implementation may guarantee that if any operation has flushed, all previous operations have also flushed. In some embodiments, for example, as part of persisting an operation for a thread, effects of prior operations are flushed before performing and persisting the operation by invoking the flushChronicle( ) function. This function in effect guarantees lock-free forward progress to the chronicle data structures.

Notice that, in this example, both push and pop operations append and persist a new State node in the chronicle stack's chronicle list. The State object itself may be implemented such that it retains the last-in-first-out (LIFO) structure of the stack. Also note that the "commit" point of the operation (i.e., the point at which the operation becomes persistent) is the next chronicle flush (by any thread) of the linearizing CAS to s→next.

In some embodiments, since an output signal is sent upon completion of this operation, the implementation may "respond" to the invocation as a persistently visible signal, keyed uniquely to the persistent invocation signal that called this function.

In one embodiment, the Stack described above may be implemented by the following example pseudo-code. In this example, the flush operation may ensure that the argument object's current contents are made persistent (e.g., using one or more clflush instructions).

```
69      // stack node
70      class Node {
71          Object val; // the stored object
72          Node* down; // the next node down in the stack
73          Node(Object x, Node* d){val=x; down=d;}
74      }
75
76      State *ChronicleStack::flushChronicle
77      (State *fromHereForward){
78
79          State *s = fromHereForward;
80          while (s→next!=NULL){
81              flush(s);
82              s = s→next;
83          }
84          State *realState = s;
85          // now flush the chronicle all the way
86          // to the realState of the stack
87          flush(realState);
88          // now advance current to realState
89          // (this is an optimization)
90          current = realState;
91          flush(&current);
92          return realState;
93      }
94
95      int ChronicleStack::push // add an object to the stack
96          (Object x, int thread_id, int seqNum){
97
98          Invocation *inv =
99              signalLog→sigInvoke(PUSH,
100                 x,thread_id,seqNum);
101
102         State *s = current; // start of chronicle
103         while(true){ // keep trying until success
104             s = flushChronicle(s);
105             // s is now the real state,
106             // and entire chronicle is flushed
107
108             // create a new node for the top of the stack
109             Node *n = new Node(x,s→head);
110             flush(n);
111             // create a new State for the chronicle
112             s_new =
113                 new State(n,NULL,thread_id,
114                 PUSH,seqNum,SUCCESS);
115             flush(s_new); // make s_new persistent
116
117             // append new State to the stack and chronicle
118             if(CAS(&s→next,NULL,s_new)){
119                 flush(&s→next); // flush change to s→next
120                 signalLog→sigResponse(inv,SUCCESS);
121                 return SUCCESS;
122             }
123             // if CAS failed, stack head changed, so retry
124         }
125     }
126
127     Object ChronicleStack::pop // remove an object
128                               // from the stack
129         (int thread_id, int seqNum){
130
131         Invocation *inv =
132             signalLog→sigInvoke(POP,
133             thread_id,seqNum);
134
135         State *s = current; // start of chronicle
136         while(true){ // keep trying until success
137             s = flushChronicle(s);
138             // s is now the real state,
139             // and entire chronicle is flushed
140
141             // do pop like normal Treiber stack
142             Object x = h→head→val;
143             Node n = s→head→down;
144
145             // and create a new State for
146             // the new head of the stack
147             s_new =
148                 new
                    State(n,NULL,thread_id,POP,seqNum,x);
149             flush(s_new);
150
151             // append new State to the stack and chronicle
152             if(CAS(&s→next,NULL,s_new)){
153                 flush(s); // flush change to s→next
154                 signalLog→sigResponse(inv,x);
155                 return x;
156
157             }
158             // if CAS failed, stack State
159             // has changed, so retry
160         }
161
162     }
163
```

Recovery

In some embodiments, in response to a failure, the state of the chronicle stack may need to be recovered. In some embodiments, the persistent signal protocol may record all ongoing invocation and response events in persistent memory. This signal log may then be used to determine how to handle incomplete operations on the stack. In some embodiments, a simple interface to a recovery process may be provided, such as that shown in the pseudo-code in lines 164-199 above.

In some embodiments, when there is a failure, it may be assumed that all non-persistent memory is reset. Upon restarting, it may be expected that the system calls a persistent data structure recovery handler, such as the recover( ) method illustrated herein. In some embodiments, this handler may be used to recover the data structure's state. For example, the handler may enumerate all of the "pending" invocations (i.e., operations that were invoked, but for which there are not any corresponding responses) and may execute them to completion. In some embodiments, even the completed operations' responses may be returned during recovery (in case the failure occurred immediately before the return, i.e., between the operation persist and the return). In some embodiments, the perusal of the chronicle list in chronicleContains may be optimized to improve recovery time.

In one embodiment, the recovery of a Chronicle Stack following as failure, as described above, may be implemented by following example pseudo-code.

```
164     // Check to see if the operation has
165     // been committed to persistent state
166     bool ChronicleStack::chronicleContains
167         (Invocation inv){
168
169         State *s = chronicle
170         while (s!= NULL){
171             // compare inv with s
172             if(inv.args["tid"]==s→tid &&
173                 inv.args["seqNum"]==s→seqNum)
```

```
174              return true;
175          }
176          return false;
177      }
178
179      ChronicleStack::recover( ){
180          vector<Invocation> toFinish =
181              signalLog->getIncompleteOperations( );
182          for each Invocation inv in toFinish {
183              s = chronicleContains(inv)
184              if(s!=NULL){
185                  // operation has committed,
186                  // but not returned
187                  respond s->ret to inv
188              }
189              else{
190                  // operation did not commit,
191                  // so redo it
192                  inv.func(inv.args)
193              }
194          }
195          // advance chronicle
196          chronicle = current;
197          flush(&chronicle);
198      }
199
```

Chronicle Queue

As previously noted, different data structures may include different implementations of the State object, in some embodiments. For example, some embodiments may provide a chronicle queue implementation. In some embodiments, a chronicle queue's State object may contain the Head and Tail pointers, or may point to a metadata structure that contains the Head and Tail pointers. In some embodiments, a chronicle queue may track three fields (Head, Tail, and tailNext) in the State object. One embodiment of an implementation of a State object and ChronicleQueue may be illustrated by the following example pseudo-code. Note that, in some embodiments, the recovery routines for the ChronicleQueue may be the same as the ones described for the ChronicleStack.

```
200      class State {
201          State *next; // the next State in the chronicle
202          Node *head; // the head Node in the queue
203          Node *tail; // the tail Node in the queue
204          Node *tailNext; // the next of tail in the queue
205                  // (used to capture the first state during
206                  // an enqueue operation which is followed by
207                  // assigning tail to tailNext)
208          int thread_id; // the thread id of the thread
209                  // doing this operation
210          int operation; // which operation (enqueue or dequeue)
211          int seqNum; // a unique id per thread of this operation
212          void *ret; // return value of this operation
213
214          // the thread_id, seqNum, ret and operation member vars
215          // in the chronicle allow the determination of a totally
216          // ordered history of the queue, e.g. "Thread 1 did an
217          // enqueue as its 5th operation".
218          State(Node *h, Node *t, Node *tn, State *nxt, int tid,
219                  int op, int seq) {
220              next = nxt; head = n; tail = t; tailNext = tn;
221              thread_id = tid; operation = op; seqNum = seq;
222          }
223      };
224
225      class ChronicleQueue {
226          State *chronicle; // a log of all operations that have
227                  // been invoked on this data structure
228          State *current; // the most recent persisted entry
229          SignalLog *signalLog;
230          ChronicleQueue( ) {
231              chronicle = new State(NULL, NULL, NULL, NULL,
232                          NO_THREAD, INIT, 0);
233              current = chronicle;
234              signalLog = new SignalLog( );
235          }
236      };
```

One embodiment of an implementation of the SignalLog interface for the ChronicleQueue example may be illustrated by the example pseudo-code given in lines 39-68 above for the ChronicleStack example. In some embodiments, this may serve as the interface that enables an explicit handshake between the chronicle queue and the enclosing application for correct recovery.

The example pseudo-code shown in lines 237-346 below depicts an example chronicle queue implementation.

```
237      // queue node
238      class QNode {
239          Object val; // the stored object
240          QNode *next; // the next node in the queue
241          Node(Object x) {val = x; next = NULL; }
242      };
243
244      State *ChronicleQueue::flushChronicle
245              (State *fromHereForward) {
246
247          State *s = fromHereForward;
248              while (s->next != NULL) {
249                  if (s->tail != s->tailNext) {
250                      s->tail->next = s->tailNext;
251                      flush(s->tail);
252                      s->tail = s->tailNext;
253                      if (s_new->head == NULL) {
254                          s_new->head = s_new->tail;
255                      }
256                  }
257                  flush(s);
258              }
259              // now advance current to the new real state
260              // (this is an optimization)
261              current = s;
262              flush(&current);
263              return s;
264      }
265
266      int ChronicleQueue::enqueue // add an object to the queue
267              (Object x, int threadId, int seqNum) {
268
269          Invocation *inv =
270              signalLog->sigInvoke(ENQUEUE, x, threadId,
271                                   seqNum);
272          State *s = current; // start of chronicle
273          while (true) { // keep trying until success
274              s = flushChronicle(s);
275              // s is now the real state,
276              // and entire chronicle is flushed
277
278              // create a new node for the tail end of the queue
279              QNode *n = new QNode(x);
280              flush(n);
281              // create a new State for the chronicle
282              State *s_new =
283                  new State(s->head, s->tail, n, threadId,
284                                   ENQUEUE, seqNum);
285              flush(s_new); // make s_new persistent
286
287              // append new State to the queue's chronicle
288              if (CAS(&s->next, NULL, s_new)) {
289                  flush(&s->next); // flush change to s->next
290                  // stitch up the queue structure
291                  s_new->tail->next = new->tailNext;
292                  flush(s->tail);
```

```
293            // change the tail to the new tail
294            s_new->tail = s_new->tailNext;
295            if (s_new->head == NULL) {
296                s_new->head = s_new->tail;
297            }
298            flush(s_new);
299            signalLog->sigResponse(inv, SUCCESS);
300            return SUCCESS;
301        }
302        // if CAS failed, queue state changed in between,
303        // so retry
304    }
305 }
306
307 Object ChronicleQueue::dequeue // remove an object
308                                // from the queue
309            (int threadId, int seqNum) {
310
311    Invocation *inv =
312        signalLog->sigInvoke(DEQUEUE, threadId, seqNum);
313    State *s = current; // start of chronicle
314    while (true) { // keep trying until success
315        s = flushChronicle(s);
316        // s is now the real state,
317        // and entire chronicle is flushed
318
319        // get the queue head
320        Object *x = NULL;
321        QNode *newHead = NULL;
322        QNode *newTail = NULL;
323        QNode *newTailNext = NULL;
324        if (s->head != NULL) {
325            x = s->head->value;
326            newHead = s->head->next;
327            if (newHead != NULL) {
328                newTail = s->tail;
329                newTailNext = s->tailNext;
330            }
331        }
332
333        // create a new State for the new head of the queue
334        s_new = new State(newHead, newTail, newTailNext,
335                          threadId, DEQUEUE, seqNum);
336        flush(s_new);
337
338        // append new State to the queue's chronicle
339        if (CAS(&s->next, NULL, s_new)) {
340            flush(s); // flush change to s->next
341            signalLog->sigResponse(inv, x);
342            return x;
343        }
344        // if CAS failed, queue changed in between, so retry
345    }
346 }
```

Figure 1:
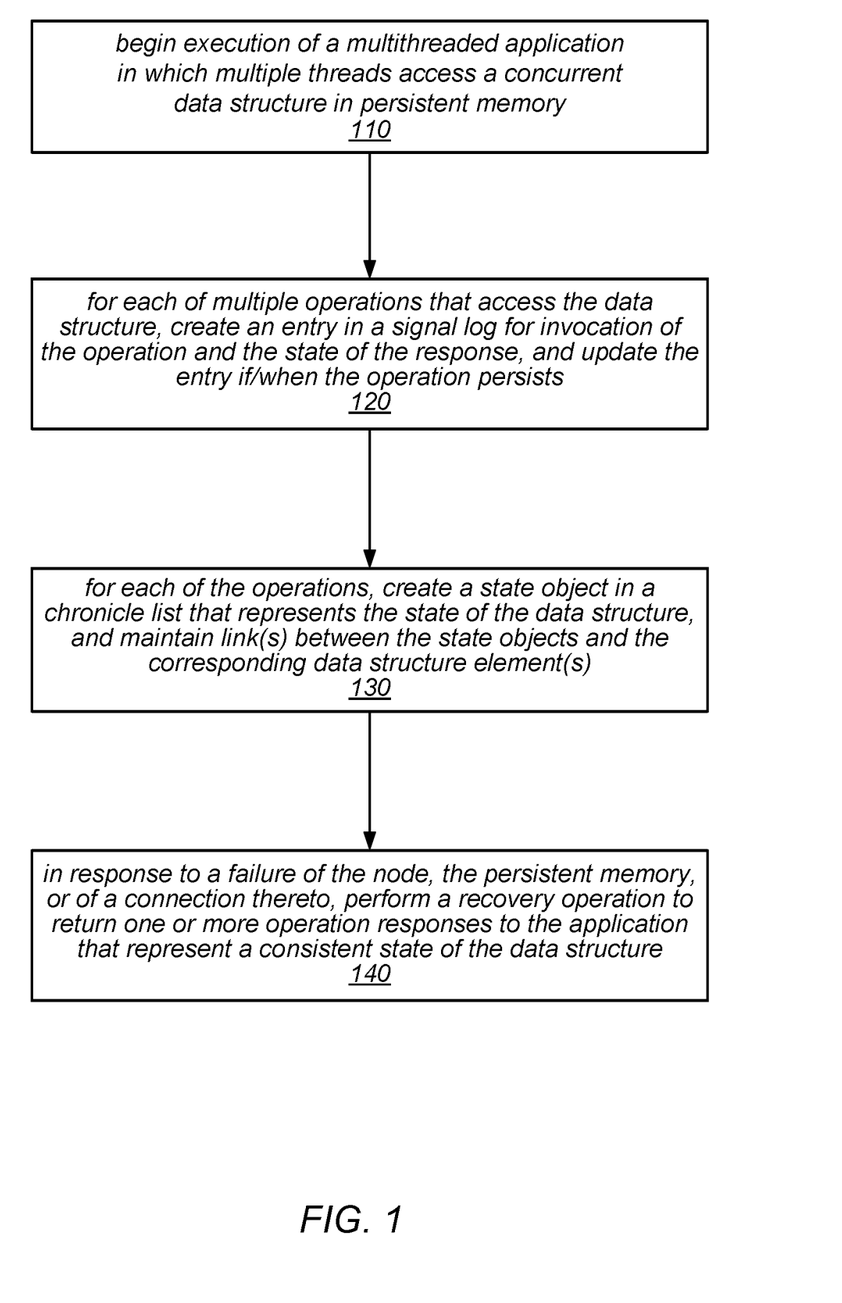
FIG. 1 is a flow diagram illustrating one embodiment of a method for executing an application that includes accesses to a composable persistent data structure.

FIG. 1 is a flow diagram illustrating one embodiment of a method for executing an application that includes accesses to a composable persistent data structure. As illustrated in this example, the method may include beginning execution of a multithreaded application in which multiple threads access a concurrent data structure in persistent memory (as in 110); creating, for each of multiple operations that access the data structure, an entry in a signal log for invocation of the operation and the state of the response, and updating the entry if/when the operation persists (as in 120), and creating, for each of the operations, a state object in a chronicle list that represents the state of the data structure, and maintaining link(s) between the state objects and the corresponding data structure element(s) (as in 130); and in response to a failure of the node, the persistent memory, or a connection thereto, performing a recovery operation to return one or more operation responses to the application that represent a consistent state of the data structure (as in 140). In some embodiments, elements 120 and 130 may be performed at least in part in parallel.

Figure 2:
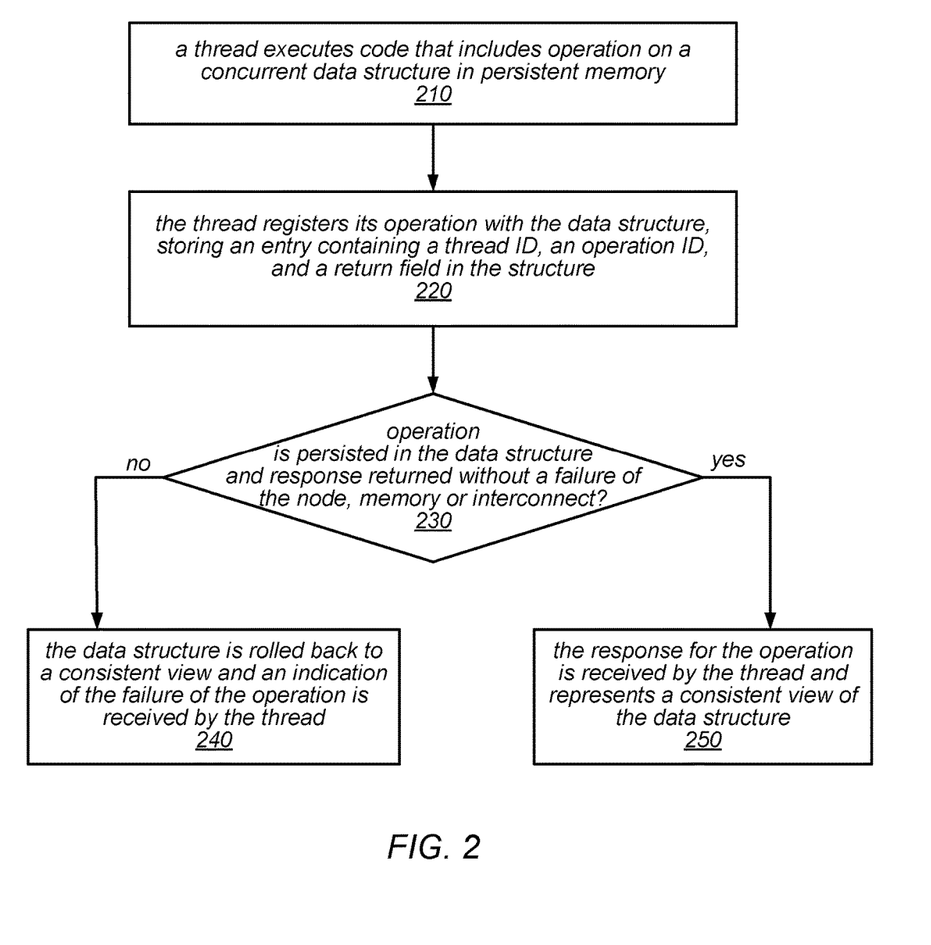
FIG. 2 is a flow diagram illustrating one embodiment of a method for an application to perform an operation on a composable persistent data structure.

FIG. 2 is a flow diagram illustrating one embodiment of a method for an application to perform an operation on a composable persistent data structure. As illustrated in this example, the method may include a thread executing code that includes operation on a concurrent data structure in persistent memory (as in 210); and the thread registering its operation with the data structure, storing an entry containing a thread ID, an operation ID, and a return field in the structure (as in 220). If operation is persisted in the data structure and its response is returned without a failure of the node, memory or interconnect (shown as the positive exit from 230), the response for the operation is received by the thread and represents a consistent view of the data structure (as in 250). Otherwise, the data structure is rolled back to a consistent view and an indication of the failure of the operation is received by the thread (as in 240).

Figure 3:
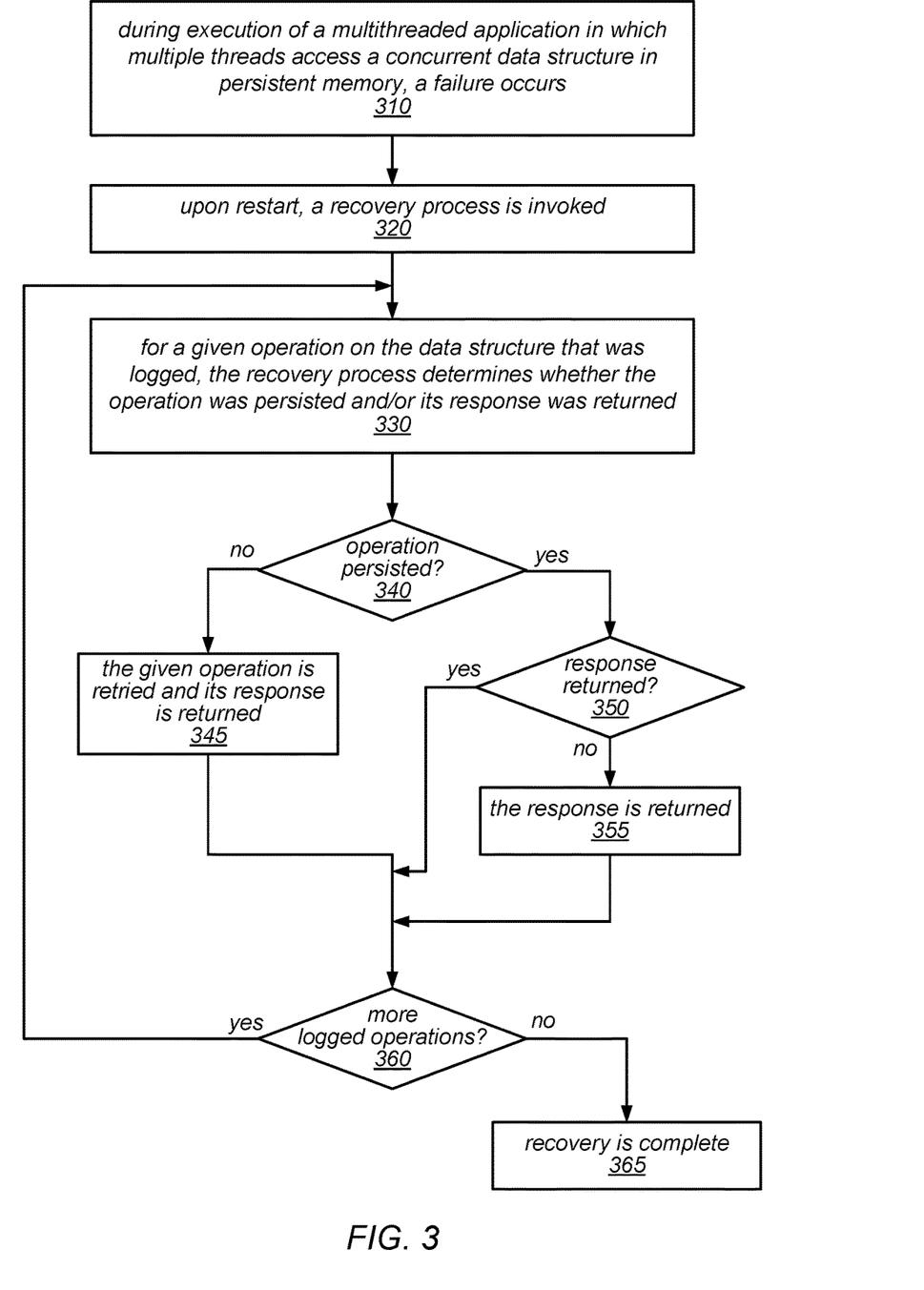
FIG. 3 is a flow diagram illustrating one embodiment of a method for performing a recovery operation for an application that includes accesses to a composable persistent data structure.

FIG. 3 is a flow diagram illustrating one embodiment of a method for performing a recovery operation for an application that includes accesses to a composable persistent data structure. As illustrated in this example, during execution of a multithreaded application in which multiple threads access a concurrent data structure in persistent memory, a failure may occur (as in 310). Upon restart, a recovery process may be invoked (as in 320). For a given operation on the data structure that was logged, the recovery process may determine whether the operation was persisted and/or whether its response was returned, as in 330. If the operation was not persisted (shown as the negative exit from 340) and/or if its response was not returned (shown as the negative exit from 350), the recovery process may perform these actions on behalf of the operation. The method may include repeating some or all of the operations shown as 330-355, as appropriate, for any other logged (pending) operations (shown by the feedback from 360 to 330) until the recovery is complete (as in 365).

Figure 4:
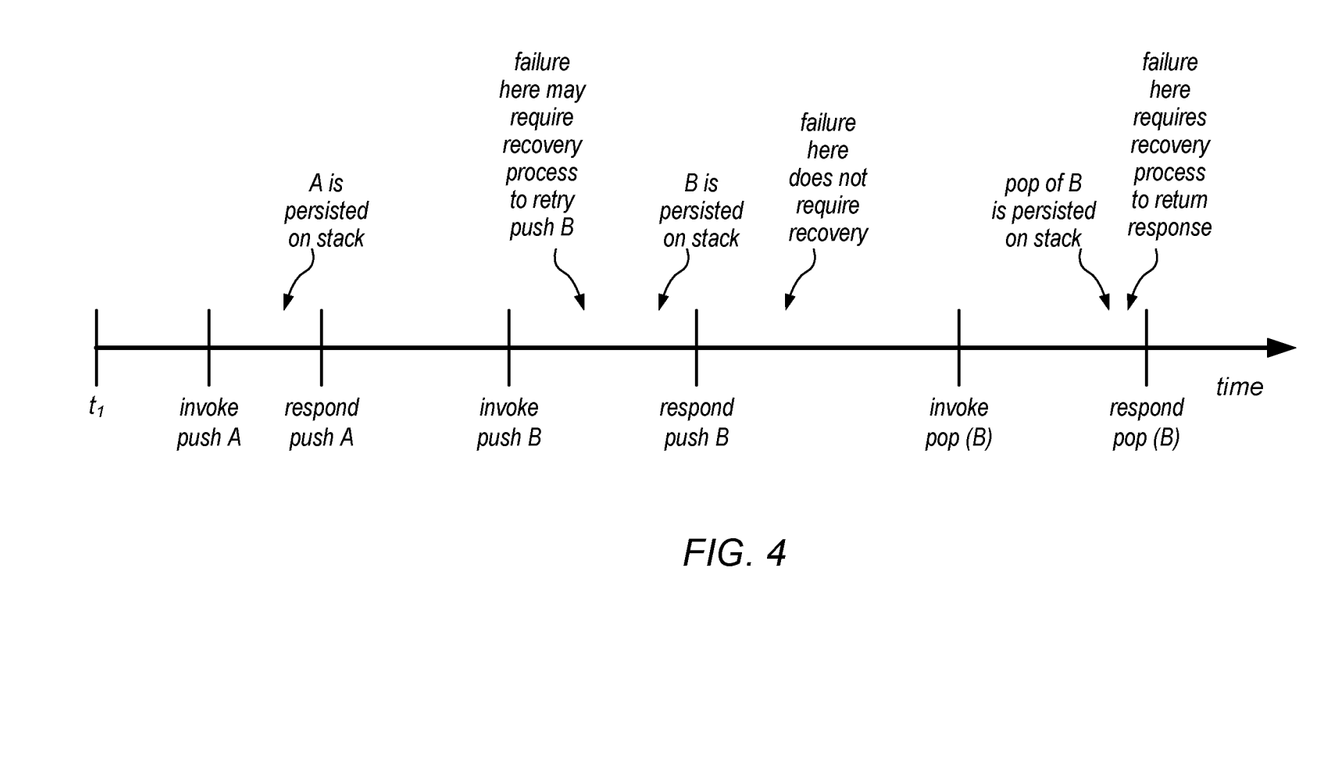
FIG. 4 illustrates a portion of a linearizable history of events involving a stack structure that is implemented in persistent memory.

FIG. 4 illustrates a portion of a linearizable history of events involving a stack structure that is implemented in persistent memory, according to at least some embodiments. In this example, three operations are invoked on the stack, in the following order: push A, push B, pop (which should return B), and the history includes an invocation event and a response event for each of the operations. As illustrated in FIG. 4 and described above, once an operation has been persisted, its response may be returned to the enclosing application context. If a failure occurs after one operation has been persisted and returned, but before the next operation is invoked, there may be no need to perform a recovery operation for the persistent data stack. However, in some embodiments, if a failure occurs after an operation has been persisted, but before its response is returned to the enclosing application context, a recovery process may be configured to return its response. In some embodiments, if a failure occurs between invocation of an operation and its persistence, the recovery operation may be configured to retry the operation, as shown in FIG. 4. In other embodiments, the recovery operation may not be configured to retry an operation in this scenario, but may instead be configured to remove the invocation event from the history and return an indication that the operation failed to the enclosing application context.

Optimizations

Figure 5:
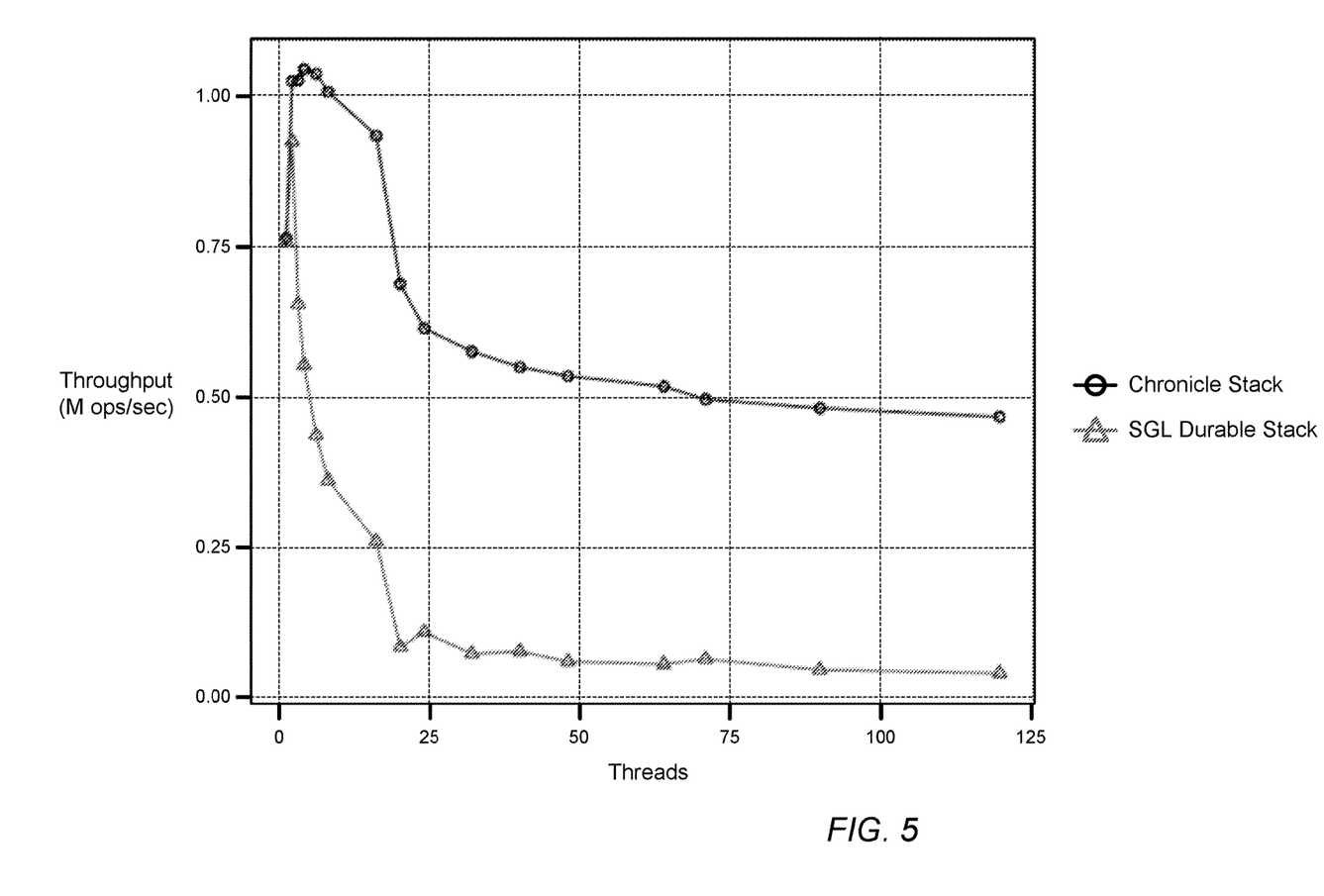
FIG. 5 illustrates the performance of a chronicle stack and a locking stack on a microbenchmark, according to at least some embodiments.

In some embodiments, various optimizations may be applied to make the chronicle flush more practical and/or to prevent unnecessary flushing of the entire structure. For instance, in some embodiments, every thread may log, in non-persistent, per-thread memory, the latest State object it has seen, thus preventing it from re-flushing State objects. Threads may also share, in non-persistent, shared memory, the latest State that any of them has seen (or has appended). This CAS-protected location may, in general, prevent double flushing of State objects, especially under low contention. Note that the experimental results illustrated in FIG. 5 represent results for an embodiment that included this optimization.

In some embodiment, by leveraging the optimizations described above, State objects may be garbage collected when they are too old. For example, for a given State object in the chronicle, as long as its owning thread has linearized and persisted a later operation, State objects can be deleted off the head of the chronicle by swinging the shared persistent chronicle pointer forward.

Evaluation

The techniques and algorithms described herein for creating and utilizing persistent data structures (using, more specifically, an example persistent chronicle stack) have been evaluated on a Haswell machine, which includes two eighteen-core, two-way hyperthreaded Intel Xeon E5-2699 v3 processors at 3.6 GHz (i.e., with up to 72 hardware threads). The machine ran Fedora Core 19 Linux. In this machine, the last-level cache (45 MB) is shared by all cores of a given processor, while each core holds its own private L1 and L2 caches. In the evaluations, each thread was assigned to its core, filling a processor of all hardware threads before moving onto the second socket. Once all cores were filled, hyperthreading was added in the same manner, assigning one socket completely before adding the hyperthreads of the other. The code was written in C++ and compiled by g++ 4.8.2 at the −O3 optimization level.

During the evaluation, the flush instruction was simulated using a high resolution busy wait of 100 ns, which is equivalent to a round trip full cache line flush. Cache line dirtiness was not tracked, and all flush operations were assumed to stall the program for the full amount of time.

The microbenchmark executed during the evaluation consisted of all threads randomly choosing to insert or remove an item from the stack for a duration of ten seconds. For each test, five runs were performed, and the maximum data point was reported, as is standard practice for testing concurrent data structures. Prior to testing, all pages were pre-faulted to avoid soft faults.

As part of the evaluation, a locking strictly failure resilient stack was also implemented, which used flushes appropriately to add and remove nodes from the stack, and which maintained a log. The flushes to the data structure and the log were performed within the push and pop critical sections.

FIG. 5 illustrates the performance of the chronicle stack and the locking stack on the microbenchmark, according to at least some embodiments. As seen in FIG. 5, the chronicle stack performed up to ten times better than the locking stack. For example, the locking stack had to complete three long latency flushes while holding the lock, severely limiting its performance. In contrast, the chronicle stack required just one flush on the critical path of push and pop operations, and rest of the flushes were performed off the critical path, without impeding other threads.

Note that the drastic performance degradation with the lock based stack may be partially due to high contention for the lock. Non-blocking progress makes the chronicle stack less vulnerable to the effects of such contention. Additionally, distributing contention across the signal log, and the State object appears to have helped reduce the adverse effects of contention. It has been conjectured that, in some embodiments, finely tuned back-off parameters may be used to make the lock based stack competitive with the chronicle stack, but such fine tuning may not represent a generalizable solution.

Related Work

As previously noted, the techniques described herein for implementing and using persistent data structures rely on prior explorations done in non-blocking data structures for non-persistent memory. Classic non-blocking algorithms as well as more modern ones provided some design inspiration. For example, Herlihy and Wing's linearizability served as a predecessor correctness condition. As previously noted, work in persistent memory has ramped up significantly in the last five years, resulting in a wide variety of dedicated software and algorithms.

In general, the work described herein relates to non-ephemeral data structures. Non-ephemeral data structures are non-persistent sequential data structures which retain all previous states of the object in an efficient form. While the chronicle technique described herein is somewhat similar to this idea, it has been adapted to a concurrent, non-blocking, non-volatile context.

Other generic methods for implementing lock free objects consolidate global object state into a single State object. These techniques may demonstrate that the "chronicle" construction may be used to build any lock-free data type, in different embodiments, since the global state can be chronicled.

Conclusion

The chronicle design pattern described herein may provide a generic technique for building non-blocking persistent data structures for persistent memory. As described herein, a new correctness condition (called "strict failure resilience") may be applied to the implementation of persistent data structures, with the result that they may avoid the pitfalls of data loss that were allowed by prior correctness conditions. This new correctness condition may also allow correct composition of data structure recovery with recovery of the enclosing application. The chronicle design pattern on which strictly failure resilient data structures can be built has been presented herein, and an example chronicle stack built based on this pattern has been described in detail to demonstrate the pattern. Preliminary empirical results show that the example chronicle stack may outperform a lock-based persistent stack by an order of magnitude in the presence of high contention. In other embodiments, the chronicle design pattern may be applied on other types of persistent data structures. For example, in different embodiments, the techniques described herein may be applicable to the construction of a variety of persistent stacks, queues, linked-lists, or priority queues, among other things. In general, the techniques described herein may be applied in these and other data structure contexts to maintain a log of operations that are invoked on a persistent data structure, to determine (following a failure) which of the operations in the log have (or have not) been persisted and/or their responses returned to the enclosing application context, and returning response(s) to the enclosing application context that represent a consistent state (e.g., after applying and persisting one or more pending operations to reach a known consistent, or rolling back the state of the persistent data structure and/or its history to a known previous consistent state).

Computing System

Figure 6:
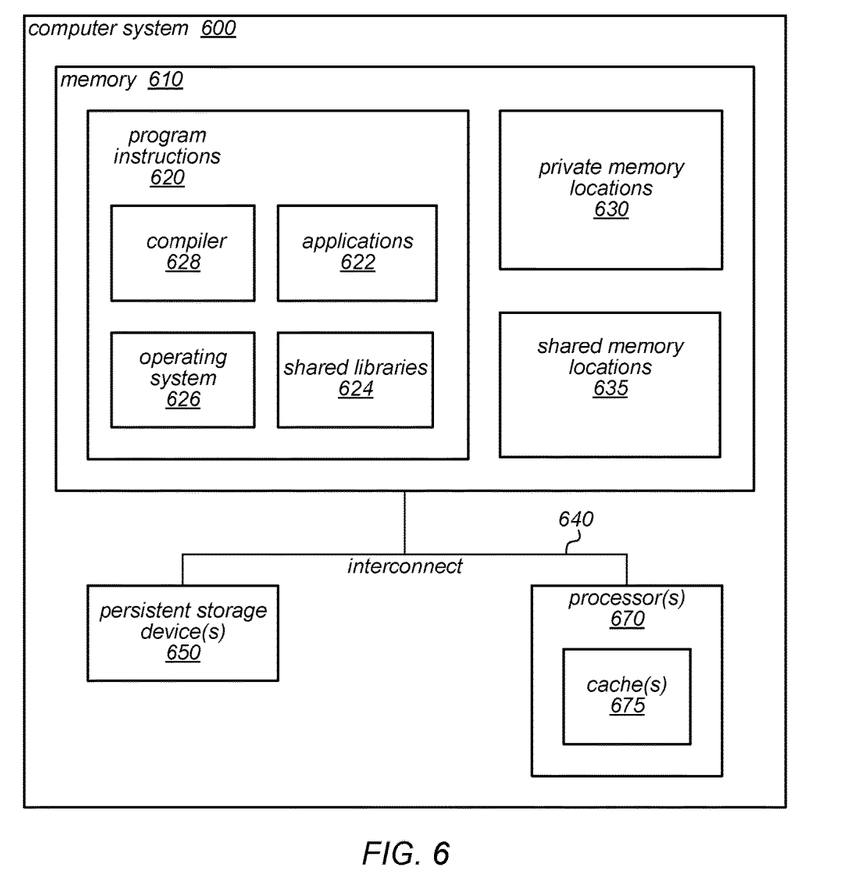
FIG. 6 is a block diagram illustrating one embodiment of a computing system that is configured to implement and/or support operations on composable data structures, as described herein.

The techniques and methods described herein for implementing persistent data structures that adhere to a strictly failure resistant correctness condition may be implemented on or by any of a variety of computing systems, in different embodiments. For example, FIG. 6 illustrates a computing system 600 that is configured to implement shared data structures and applications (or computations thereof) that create and access those data structures, according to various embodiments. The computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for creating and using futures to improve the performance of applications that access persistent data structures, as described herein, may be provided as a computer program product, or software, that may include a non-transitory, computer-readable storage medium having stored thereon instructions, which may be used to program a computer system 600 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 600 may include one or more processors 670; each may include multiple cores, any of which may be single- or multithreaded. For example, multiple processor cores may be included in a single processor chip (e.g., a single processor 670), and multiple processor chips may be included in computer system 600. Each of the processors 670 may include a cache or a hierarchy of caches 675, in various embodiments. For example, each processor chip 670 may include multiple L1 caches (e.g., one per processor core) and one or more other caches (which may be shared by the processor cores on a single processor). The computer system 600 may also include one or more persistent storage devices 650 (e.g. optical storage, magnetic storage, hard drive, tape drive, solid state memory, etc.) and one or more system memories 610 (e.g., one or more of cache, SRAM, DRAM, RDRAM, EDO RAM, DDR 10 RAM, SDRAM, Rambus RAM, EEPROM, etc.). In some embodiments, one or more of the storage device(s) 650 may be implemented as a module on a memory bus (e.g., on interconnect 640) that is similar in form and/or function to a single in-line memory module (SIMM) or to a dual in-line memory module (DIMM), except that it includes high performance byte-addressable persistent memory rather than RAM devices. In some embodiments, one or more of the persistent data structures described herein (e.g., data structures that adhere to the strictly failure resilient correctness condition described herein) may be implemented within one or more of persistent storage device(s) 650. Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

The one or more processors 670, the persistent storage device(s) 650, and the system memory 610 may be coupled to the system interconnect 640. One or more of the system memories 610 may contain program instructions 620. Program instructions 620 may be executable to implement one or more applications 622 (which may include source code and/or executable code for a multithreaded application that access persistent data structures), shared libraries 624, or operating systems 626. In some embodiments, program instructions 620 may include a compiler 628 (which may be an optimizing compiler). In some embodiments, program instructions 620 may be executable to implement a contention manager (not shown). In some embodiments, program instructions 620 (or more specifically, shared libraries 624) may also be configured to implement a persistent data structure recovery module or a persistent data structure support library, which may include methods for implementing and/or operating on persistent data structures under a strictly failure resilient correctness condition, or any other methods that may be invoked by applications 622.

Program instructions 620 may be encoded in platform native binary, any interpreted language such as Java™ byte-code, or in any other language such as C/C++, the Java™ programming language, etc., or in any combination thereof. In various embodiments, optimizing compiler 628, applications 622, operating system 626, and/or shared libraries 624 may each be implemented in any of various programming languages or methods. For example, in one embodiment, optimizing compiler 628 and operating system 626 may be based on the Java programming language, while in another embodiments they may be written using the C or C++ programming languages. Similarly, applications 622 may be written using the Java programming language, C, C++, or another programming language, according to various embodiments. Moreover, in some embodiments, optimizing compiler 628, applications 622, operating system 626, and/ shared libraries 624 may not be implemented using the same programming language. For example, applications 622 may be C++ based, while optimizing compiler 628 may be developed using C.

In some embodiments, the program instructions 620 may include transactional memory support and/or other functions, operations, or procedures for implementing multithreaded applications that access persistent data structures, as described herein. Such support and functions may exist in one or more of the shared libraries 624, operating systems 626, or applications 622, in various embodiments. The system memory 610 may further comprise private memory locations 630 and/or shared memory locations 635 where data may be stored. For example, in some embodiments, shared memory locations 635 may store data, metadata, or other shared resources (e.g., metadata associated with persistent data structures, such as stacks, queues, and list-based sets that are operated on using the techniques described herein, or list/queues of pending operations) that are accessible to multiple, concurrently executing threads, processes, or transactions, in various embodiments. In some embodiments, private memory locations 630 and/or shared memory locations 635 may store thread-local lists of pending operations, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of operations and correctness conditions that support creating and using persistent data structures to improve the performance of applications that access shared data structures, it should be noted that the techniques and mechanisms disclosed herein for creating and using persistent data structures may be applicable in other contexts in which applications access different types of persistent data structures than those described in the examples herein and/or in which different correctness conditions are supported. It is intended that the following claims be interpreted to embrace all such variations and modifications.

What is claimed is:

1. A method, comprising:
performing by one or more computing nodes in a system that supports multithreading:
beginning execution of a multithreaded application that comprises a plurality of operations targeting a concurrent data structure implemented in persistent memory, wherein the concurrent data structure is accessible by a plurality of threads of the multithreaded application;
performing, on behalf of one or more threads of the application, one or more operations that target the concurrent data structure, wherein, for at least some of the one or more operations, said performing comprises:
creating an entry in a signal log implemented in the persistent memory, wherein the entry represents an invocation of the operation and a state of its response;
persisting the entry in the signal log;
persisting the operation on the concurrent data structure in the persistent memory; and
returning an indication of the state of its response to the thread on whose behalf the operation was performed;
performing, in response to a failure of a computing node on which the multithreaded application is executing, the persistent memory, or a connection between a computing node on which the multithreaded application is executing and the persistent memory, a recovery operation that returns a respective response for each of at least one other operation that targets the concurrent data structure and for which an entry was created in the signal log;
wherein the returned responses of each of the one or more operations and the returned respective responses for each of the at least one other operation collectively represent a consistent state of the data structure.

2. The method of claim 1,
wherein said beginning execution comprises creating a state object for a chronicle list that represents a state of the concurrent data structure;
wherein the method further comprises updating the state object for the chronicle list to reflect one or more changes to the state of the concurrent data structure.

3. The method of claim 2, wherein, for at least some of the one or more operations, said performing further comprises updating, in response to a change in the state of its response, the entry in the signal log to reflect the change in the state of its response.

4. The method of claim 3, wherein said performing one or more operations and said updating the state object are performed, at least in part, in parallel.

5. The method of claim 3, wherein, for at least some of the one or more operations, said performing further comprises flushing the chronicle list from a current state object prior to said persisting the operation, wherein said flushing the chronicle list flushes effects of prior operations before persisting the operation.

6. The method of claim 3, further comprising:
maintaining, in a memory location accessible by at least one of the one or more threads of the application, an indication of a last state object that the at least one thread has seen;
wherein, for at least some of the one or more operations, said performing further comprises:
checking the memory location to determine if a current state object for the operation is the state object as indicated in the memory location;
if the current state object is the state object as indicated in the memory location, performing and persisting the operation without flushing the chronicle list; and
if the current state object is not the state object as indicated in the memory location, flushing the chronicle list from the current state object prior to said performing and persisting the operation.

7. The method of claim 1, wherein said performing a recovery operation comprises, for each operation of the at least one other operation:
determining whether or not the operation was persisted prior to the failure and whether or not its response was returned to the thread on whose behalf the operation was to be performed prior to the failure; and
in response to determining that the operation was not persisted prior to the failure or that its response was not returned to the thread on whose behalf the operation was to be performed prior to the failure, performing one or more of: persisting the operation on the concurrent data structure in the persistent memory, or returning its response to the thread on whose behalf the operation was to be performed.

8. The method of claim 1, wherein the concurrent data structure is implemented as a stack data structure, and wherein the operation targeting the concurrent data structure is one of a push operation to add an element to the stack or a pop operation to remove an element from the stack.

9. The method of claim 1, wherein the concurrent data structure is implemented as a queue data structure, and wherein the operation targeting the concurrent data structure is one of an enqueue operation to add an element to the queue or a dequeue operation to remove an element from the queue.

10. The method of claim 1, wherein the returned response for each of the one or more operations includes an indication that the operation succeeded and was persisted to the concurrent data structure, and wherein the returned response for each of the least one other operation includes an indication that the operation failed and was not persisted to the concurrent data structure.

11. A system, comprising:
one or more processor cores;
a volatile memory coupled to the one or more processor cores; and
a byte-addressable persistent memory coupled to the one or more processor cores;
wherein the persistent memory stores a concurrent data structure;
wherein the volatile memory stores:
program instructions that when executed on the one or more processor cores cause the one or more processor cores to implement a multithreaded application that invokes a plurality of operations targeting the concurrent data structure; and program instructions that when executed on the one or more processor cores cause the one or more processor cores to implement a persistent data structure support module;

wherein in response to invocation by a thread of the multithreaded application of an operation targeting the concurrent data structure, the persistent data structure support module is configured to attempt to perform and persist the operation targeting the concurrent data structure and to return a response for the operation to the thread; and wherein in response to failing to successfully perform and persist the operation targeting the concurrent data structure and to return the response for the operation prior to a failure in the system, the persistent data structure support module is configured to perform a recovery operation that returns a consistent state of the concurrent data structure to the thread, wherein, to perform the recovery operation, the persistent data structure support module is configured to:

determine whether or not the operation was persisted prior to the failure and whether or not its response was returned to the thread on whose behalf the operation was to be performed prior to the failure; and in response to determining that the operation was not persisted prior to the failure or that its response was not returned to the thread on whose behalf the operation was to be performed prior to the failure, perform one or more of: persist the operation on the concurrent data structure in the persistent memory, or return its response to the thread on whose behalf the operation was to be performed.

12. The system of claim 11,
wherein the concurrent data structure comprises a stack, a queue, a linked-list, or a priority queue; and
wherein the operation targeting the concurrent data structure comprises an operation to add an element to the data structure, to remove an element from the data structure, or to modify an element of the data structure.

13. The system of claim 11, wherein the volatile memory stores program instructions that when executed on the one or more processor cores cause the one or more processor cores to:

implement a state object for a chronicle list that represents a state of the concurrent data structure;

update the state object for the chronicle list to reflect one or more changes to the state of the concurrent data structure; and flush the chronicle list from a current state object prior to said persisting the operation, wherein said flushing the chronicle list flushes effects of prior operations before persisting the operation.

14. The system of claim 11, wherein the volatile memory stores program instructions that when executed on the one or more processor cores cause the one or more processor cores to:

implement a state object for a chronicle list that represents a state of the concurrent data structure;

update the state object for the chronicle list to reflect one or more changes to the state of the concurrent data structure;

store, in a memory location accessible by at least one thread of the application, an indication of a last state object that the at least one thread has seen;

check the memory location to determine if a current state object for the operation is the state object as indicated in the memory location;

if the current state object is the state object as indicated in the memory location, flush the chronicle list from the current state object prior to said performing and persisting the operation; and if the current state object is not the state object as indicated in the memory location, perform and persist the operation without flushing the chronicle list.

15. A non-transitory, computer-readable storage medium storing program instructions that when executed on one or more computers cause the one or more computers to perform:

beginning execution of a multithreaded application that comprises a plurality of operations targeting a concurrent data structure implemented in persistent memory, wherein the concurrent data structure is accessible by a plurality of threads of the multithreaded application;

initiating, by a given thread of the application, an operation targeting the concurrent data structure, wherein said initiating comprises storing, in the concurrent data structure, an entry comprising a thread identifier, an operation identifier, and a return field; and receiving, by the given thread, a response for the operation that represents a consistent view of the concurrent data structure.

16. The non-transitory, computer-readable storage medium of claim 15, wherein the response comprises:

an indication that the operation targeting the concurrent data structure failed and was not persisted to the concurrent data structure; or an indication that the operation targeting the concurrent data structure succeeded and was persisted to the concurrent data structure.

17. The non-transitory, computer-readable storage medium of claim 15, wherein the program instructions, when executed on one or more computers, further cause the one or more computers to perform:

implementing a state object for a chronicle list that represents a state of the concurrent data structure;

updating the state object for the chronicle list to reflect changes to the state of the concurrent data structure; and flushing the chronicle list from a current state object prior to storing the entry in the concurrent data structure, wherein said flushing the chronicle list flushes effects of prior operations before persisting the operation to the concurrent data structure.

18. The non-transitory, computer-readable storage medium of claim 15, wherein the concurrent data structure is implemented as a stack data structure.

19. The non-transitory, computer-readable storage medium of claim 15, wherein the concurrent data structure is implemented as a queue data structure.

* * * * *

UNITED STATES PATENT AND TRADEMARK OFFICE
CERTIFICATE OF CORRECTION

PATENT NO. : 10,007,581 B2
APPLICATION NO. : 14/988566
DATED : June 26, 2018
INVENTOR(S) : Marathe et al.

Page 1 of 1

It is certified that error appears in the above-identified patent and that said Letters Patent is hereby corrected as shown below:

In the Specification

In Column 5, Line 62, after "call" insert -- . --.

Signed and Sealed this
Second Day of April, 2019

Andrei Iancu
*Director of the United States Patent and Trademark Office*